United States Patent [19]
Frick et al.

[11] Patent Number: 5,329,818
[45] Date of Patent: Jul. 19, 1994

[54] CORRECTION OF A PRESSURE INDICATION IN A PRESSURE TRANSDUCER DUE TO VARIATIONS OF AN ENVIRONMENTAL CONDITION

[75] Inventors: Roger L. Frick, Hackensack; Gregory S. Munson, Minneapolis, both of Minn.

[73] Assignee: Rosemount Inc., Eden Prairie, Minn.

[21] Appl. No.: 890,627

[22] Filed: May 28, 1992

[51] Int. Cl.⁵ .................... G01L 19/04; G01L 9/12
[52] U.S. Cl. ............................ 73/708; 73/718
[58] Field of Search ............... 73/708, 718, 724, 765, 73/766, 862.622, 862.623, 861.03; 336/283; 324/60; 364/558

[56] References Cited

U.S. PATENT DOCUMENTS

| | | | |
|---|---|---|---|
| 4,091,683 | 5/1978 | Delatorre | 73/718 |
| 4,226,125 | 10/1980 | Waugh | 73/708 |
| 4,321,832 | 3/1982 | Runyan | 73/708 |
| 4,366,716 | 1/1983 | Yoshida | 73/718 |
| 4,370,890 | 2/1983 | Frick | 73/718 |
| 4,370,891 | 2/1983 | Pickering et al. | 73/861.03 |
| 4,381,677 | 5/1983 | Ruesch et al. | 73/718 |
| 4,449,409 | 5/1984 | Antonazzi | 73/724 |
| 4,598,381 | 7/1986 | Cucci | 364/558 |
| 4,625,560 | 12/1986 | Sanders | 73/718 |
| 4,741,214 | 5/1988 | Vidmantas | 73/708 |
| 4,765,188 | 8/1988 | Krechmery et al. | 73/708 |
| 4,791,352 | 12/1988 | Frick et al. | 324/60 |
| 4,876,892 | 10/1989 | Arabia et al. | 73/724 |
| 4,878,012 | 10/1989 | Schulte et al. | 324/60 CD |
| 4,986,127 | 1/1991 | Shimada et al. | 73/714 |
| 5,083,091 | 1/1992 | Frick et al. | 324/678 |

FOREIGN PATENT DOCUMENTS

| | | |
|---|---|---|
| 0178368 | 4/1986 | European Pat. Off. . |
| 3925579A1 | 2/1991 | Japan . |
| 7460/92 | 2/1992 | Japan . |
| WO87/06711 | 11/1987 | PCT Int'l Appl. . |

OTHER PUBLICATIONS

Bradshaw, "ST300 'Intelligente' Druckmessumformer", Regelungstechnische Praxis 25. Jahrgang 1883 Heft 12 rtp, pp. 531–535.

Sandner et al., "Messwertumformer Werden Intelligent", Etz Elektrotechnische Zeitschrift, 104 (1983) Heft 22, p. 1174.

"ST3000 Digitaler Messumformer SFC Messumfromer-Dialog-Einheit", Honeywell GmbH, DV-399, Ref.34-ST-02-01, 4-page product brochure, undated.

Primary Examiner—Richard E. Chilcot, Jr.
Assistant Examiner—William L. Oen
Attorney, Agent, or Firm—Westman, Champlin & Kelly

[57] ABSTRACT

A two-wire transmitter includes a pressure sensor comprising first and second sensing means each having an impedance value which varies with pressure being measured and with a predetermined environmental condition, such as line pressure or temperature. A fixed impedance has an impedance value which is substantially unchanged by variations in the predetermined environmental condition. A switch alternately connects the fixed impedance into operative relation with the first and second sensing means to derive first and second signals which are each functions of pressure being measured and the predetermined environmental condition. A correction circuit processes the first and second signals, such as by a polynomial series or with a lookup table, to derive a corrected pressure signal. In one form, the sensor senses differential pressure and the predetermined environmental condition is line pressure or temperature, and the first and second signals are functions of both differential pressure and either line pressure or temperature, so the correction circuit derives an indication of differential pressure corrected for variations in either line pressure or temperature. In another form, the sensor measures line pressure and is sensitive to temperature changes, in which case the first and second signals are functions of line pressure and temperature and the correction circuit derives a line pressure signal corrected for variations in temperature.

47 Claims, 4 Drawing Sheets

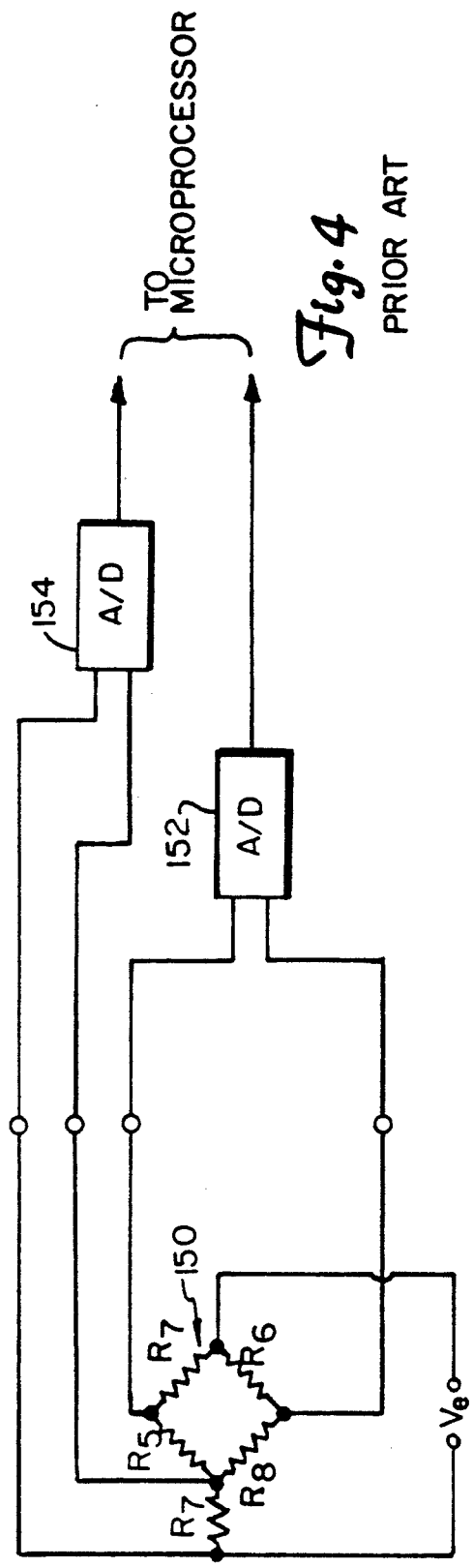
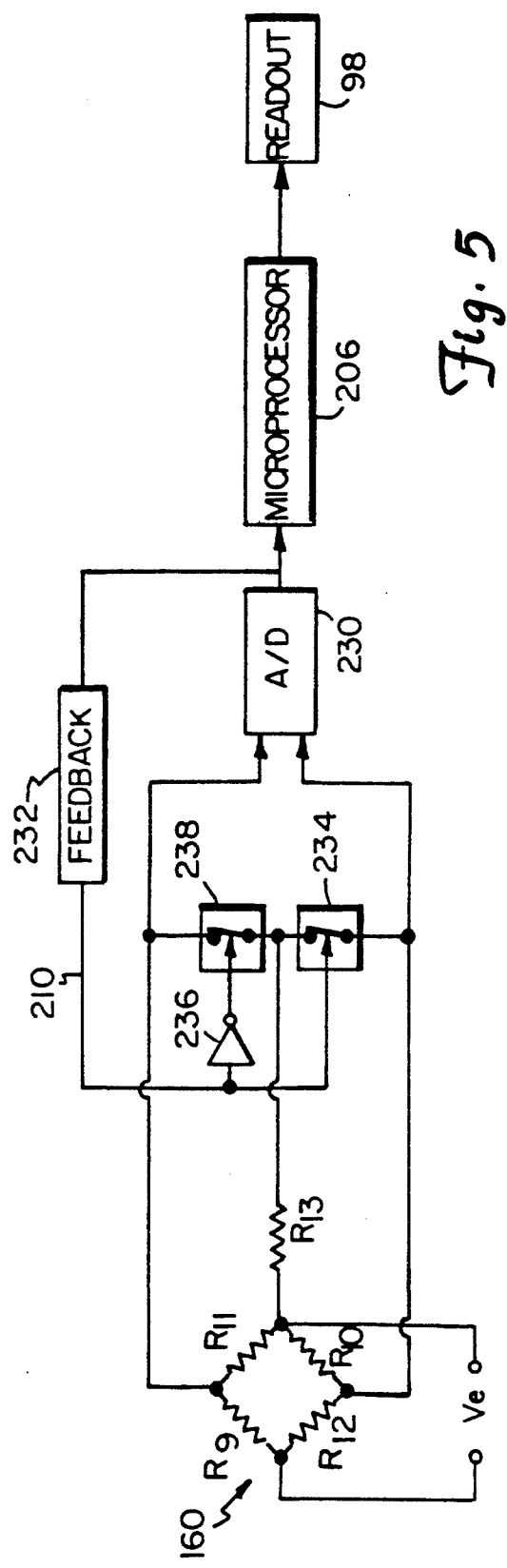

CORRECTION OF A PRESSURE INDICATION IN A PRESSURE TRANSDUCER DUE TO VARIATIONS OF AN ENVIRONMENTAL CONDITION

BACKGROUND OF THE INVENTION

The present invention involves measuring pressure, and particularly, to transmission of signals representative of two variables through a single analog-to-digital converter with minimum loss of information and minimum aliasing errors. More particularly, the present invention relates to correcting the output signal of a measurement circuit for errors in a differential pressure signal due to changes in line pressure or temperature on a differential pressure sensor, and to correcting the output signal for errors in a line or static pressure signal due to changes in temperature.

Capacitive differential pressure sensors often include a sensor housing having an inner chamber divided into two cavities by a deflectable diaphragm. A first pressure is provided to the first cavity, while a second pressure is provided to the second cavity. Difference between the first and second pressures causes the diaphragm to deflect, the amount of deflection being based on the amount of the difference in pressure.

The diaphragm typically includes a conductive portion separated from, and aligned with, conductive portions on the inner walls of the cavities to form first and second variable capacitors within the first and second cavities, respectively. As the diaphragm deflects due to differential pressure, the capacitive values of the two variable capacitors change. The pressure sensor is connected to a measurement circuit to provide an output signal representative of the capacitive values of the variable capacitors. The output signal provides a measurement of the differential pressure.

However, problems can arise due to non-linearities in the capacitive pressure sensor. For example, stray capacitances in the system can cause non-linearities which must be compensated.

Also, errors can result due to changes in line pressure. Line pressure, also commonly referred to as static pressure, can be defined in several ways. To illustrate the different definitions of line pressure, assume the first and second pressures provided to the first and second cavities of the capacitive pressure sensor have values of 2990 psi ($P_L$) and 3000 psi ($P_H$) creating a differential pressure of 10 psi (3000 psi–2990 psi). By one definition, line pressure is defined as the average of $P_H$ and $P_L$, or 2995 psi in the example. Other definitions define line pressure as simply $P_H$ or $P_L$, alone. Regardless of which definition is used for line pressure, errors in the output signal of the pressure sensor can result based on variations in line pressure.

The effects of variations in line pressure on a capacitive differential pressure sensor may be illustrated with the following examples. Where $P_H=3000$ psi and $P_L=2990$ psi, the differential pressure is 10 psi and the line pressure is 2995 psi (using the average of $P_H$ and $P_L$ as the measurement for line pressure). However, where $P_H=10$ psi and $P_L=0$ psi, the differential pressure is still 10 psi but the line pressure is 5 psi. Due to certain stresses placed on the housing of the pressure sensor, the output signal of a typical differential pressure sensor may vary 1% per 1000 psi variation in line pressure. Thus, with the examples given above, the output signal from the differential pressure may vary significantly with changes in line pressure. It is desirable to measure differential pressure and provide an output signal which is unaffected by variations in line pressure.

The Frick U.S. Pat. No. 4,370,890, issued on Feb. 1, 1983 and assigned to the same assignee as the present invention, discloses a mechanical configuration for a capacitive differential pressure sensor which attempts to compensate for unwanted mechanical stresses on the capacitive pressure sensor housing due to variations in line pressure. The Frick configuration reduces variations in the output signal of the differential pressure sensor due to variations in line pressure. However, there is a continuing need for correction techniques which correct for variations in the output signal due to variations in line pressure and which can be adjusted by electrical rather than mechanical means.

The Frick U.S. pending application Ser. No. 7-667,320, filed Mar. 8, 1991 and assigned to the same assignee as the present invention, describes the use of fixed compensation capacitors arranged with the variable capacitors of the differential sensor so that the currents through compensation capacitors subtract from the currents through variable capacitors. The capacitance values of the compensation capacitors are chosen to compensate the output of the circuit for zero and span errors caused by variations in line pressure. The use of fixed compensation capacitors is limited to an expected operating range for the sensor and may not be adequate for all conditions. Hence, there remains a need for improved correction techniques.

Another type of pressure sensor is a piezoresistive bridge sensor typically employing a bridge network of four piezoresistive elements formed on a single silicon wafer. The piezoresistive elements are arranged such that pressure applied to a diaphragm in the wafer unbalances the resistive values of the bridge. The two pressures $P_1$ and $P_2$ affect opposite sides of the diaphragm to apply differential pressure to the piezoresistive elements. Changes in differential pressure alters the impedance of two diametrically opposed piezoresistive elements of the bridge in one manner and alters the impedance of the other two diametrically opposed piezoresistive elements in an opposite manner (such as altering the impedances of piezoresistive elements $R_5$ and $R_6$ in FIG. 4 positively and altering the impedances of piezoresistive elements $R_7$ and $R_e$ negatively). The resulting output signal from the bridge is representative of differential pressure.

In the case of a piezoresistive bridge for measuring line pressure (gauge or absolute pressure), changes in pressure applied to the wafer will typically alter the impedances of two opposite piezoresistive elements positively, and will alter the impedances of the other two opposite piezoresistive elements negatively. The amount of change of impedance of each piezoresistive element is representative of line pressure.

It will be appreciated by those skilled in the art that the piezoresistive bridges may be half-bridges employing only two piezoresistive elements. The piezoresistive elements of the differential pressure bridge would be responsive to differential pressure to change the impedance of one piezoresistive element positively and to change the impedance of the other piezoresistive element negatively. The piezoresistive elements of the line pressure bridge would be responsive to line pressure to change the impedance of one piezoresistive element positively and to change the impedance of the other piezoresistive element negatively. Most present piezoresistive bridges employ four piezoresistive elements for economic reasons.

Differential pressure sensing piezoresistive bridges are responsive in to changes differential pressure as well as line pressure and temperature. Line pressure sensing piezoresistive bridges are responsive to changes in line pressure and temperature. This is the result of undesirable mechanical stresses imposed on the piezoresistive elements on the wafer due to variations in line pressure and temperature and the result of undesirable changes in resistivity of the piezoresistive elements due to variations in temperature. These stresses and changes in resistivity adversely affect output signals from the bridge. Consequently, it has been common to provide a separate temperature sensor with a line pressure bridge, and a separate line pressure bridge and a temperature sensor with a differential pressure bridge. In the case of a differential pressure bridge, the output of the bridge was processed with the outputs of the temperature sensor and line pressure bridge to calculate a corrected differential pressure. In the case of a line pressure bridge, the output of the bridge was processed with the output of the temperature sensor to calculate a corrected line pressure. Each sensor required its own dedicated analog-to-digital converter, so correction of a line pressure bridge required two converters and correction of a differential pressure bridge required three converters, each converter providing sensor input to a processor. To eliminate the requirement for two or three converters, multiplexing techniques were sometimes used to alternately connect the separate sensor outputs to a single converter, but multiplexing has the disadvantage that alternate connection of the several sensor information signals to the converter results in the loss of information due to aliasing errors.

SUMMARY OF THE INVENTION

In the present invention, a pressure sensor comprises first and second sensing means each having an impedance value which varies with pressure and also with variations of another variable environmental condition for which correction is to be made. The other variable environmental condition may be line pressure (in the case of a differential pressure sensor), or it may be temperature (in the case of either a differential pressure sensor or a line pressure sensor). A fixed impedance is alternately connected into operative relation with the first and second sensing means to derive first and second signals which are each different functions of the monitored variable and of the variable for which correction is being made.

More particularly, the first and second signals are generated during first and second update cycles and are based on the combined effective impedance of the first and second sensing means and a fixed impedance means in first and second circuit configurations. In the first circuit configuration the fixed impedance means passes a signal which alters signals passed by the first sensing means, whereas in the second circuit configuration the fixed impedance means passes a signal which alters signals passed by the second sensing means. A correction circuit is responsive to the first and second signals for calculating the value of the corrected variable being monitored.

In the preferred embodiment of the invention, the pressure being sensed is differential pressure and the correction circuit calculates differential pressure corrected for variations in line pressure. The first and second signals are functions of differential pressure and line pressure. The correction circuit processes the first and second signals in accordance with a polynomial series, or with reference to a lookup table, to derive a differential pressure signal corrected for variations in line pressure.

Also in the preferred embodiment of the invention, the differential pressure sensor is a capacitive pressure sensor which has first and second capacitive sensing means responsive to first and second pressures to provide an output representative of differential pressure. The fixed impedance means is a fixed capacitor whose capacitance value is unchanged due to changes in line pressure. Connection means alternately connects the fixed capacitor means into operative relationship to the first and second capacitive sensing means, respectively.

According to a modification of the invention, the correction circuit derives a differential pressure signal corrected for variations in temperature. In this embodiment, the fixed impedance means is a fixed capacitor having a temperature coefficient which is different from that of the first and second capacitive sensing means. The first and second signals are functions of differential pressure and temperature and are processed by the correction circuit in accordance with a polynomial series, or with reference to a lookup table, to derive a differential pressure signal corrected for variations in temperature.

In accordance with another modification of the present invention, the differential pressure sensor is a piezoresistive bridge sensor having first and second piezoresistive elements each responsive in a different manner to differential pressure to provide a bridge output representative of differential pressure. The fixed impedance means is a fixed resistor whose resistance value is unchanged due to changes in line pressure. Preferably, the fixed resistor has a temperature coefficient corresponding that of the first and second piezoresistive elements.

According to another modification of the invention, the pressure being sensed is line pressure and the correction circuit calculates line pressure corrected for variations in temperature. In this embodiment, the pressure sensor is a piezoresistive bridge sensor having first and second piezoresistive elements each responsive in a different manner to a line pressure to provide a bridge output representative of line pressure. The fixed impedance means is a fixed resistor having a temperature coefficient which is different from that of the first and second piezoresistive elements. The first and second signals are functions of line pressure and temperature and are processed by the correction circuit in accordance with a polynomial series, or with reference to a lookup table, to derive a line pressure signal corrected for variations in temperature.

BRIEF DESCRIPTION OF THE DRAWINGS

FIG. 4 is a schematic circuit diagram of a piezoresistive bridge sensor and measurement circuit for measuring differential pressure or line pressure together with a temperature sensor arranged to measure temperature in accordance with the prior art; and FIG. 5 is a schematic circuit diagram according to a modification of the present invention showing a piezoresistive bridge sensor and measurement circuit for measuring either differential pressure or line pressure incorporating correction techniques according to the present invention.

DETAILED DESCRIPTION OF THE PREFERRED EMBODIMENTS

Figure 1:
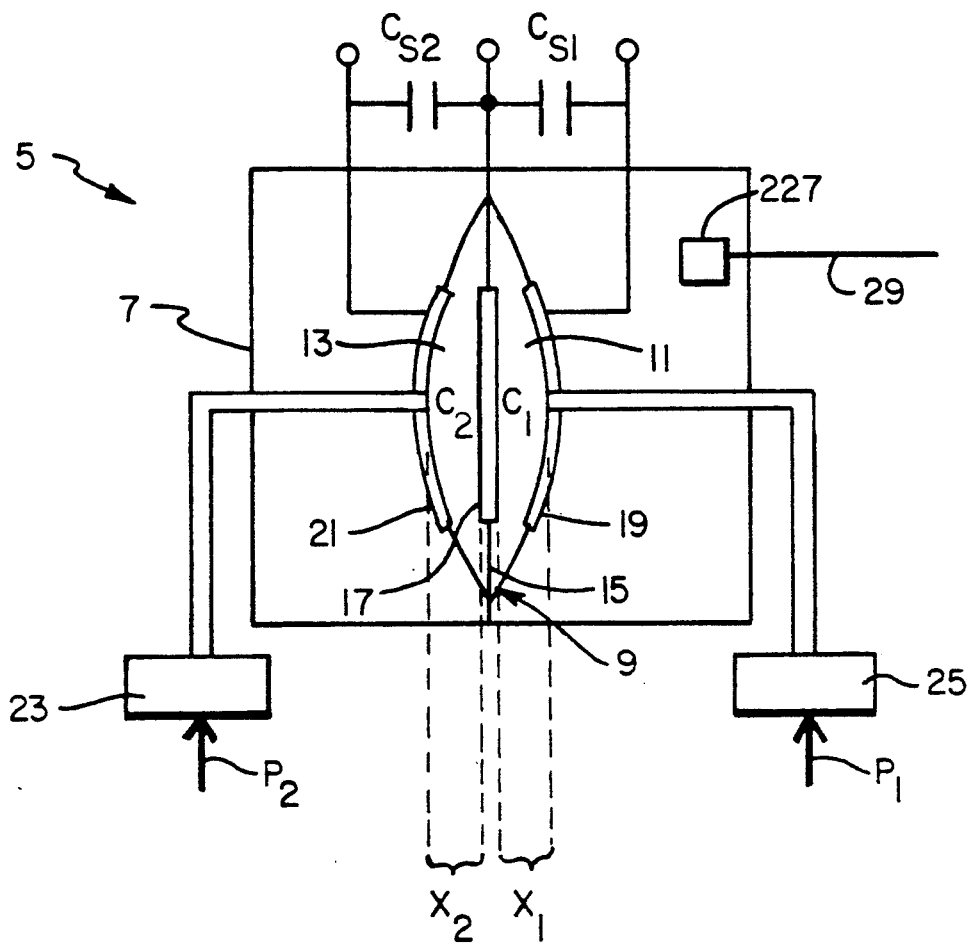
FIG. 1 is a diagram illustrating a differential pressure sensor in accordance with the prior art.

FIG. 1 shows a typical capacitive differential pressure sensor 5 which includes a housing 7 having an inner chamber 9 filled with oil having a dielectric coefficient $\epsilon_R$. The inner chamber 9 is divided into first and second cavities 11 and 13 separated by diaphragm 15. Diaphragm 15 includes a conductive portion 17 which is generally aligned with, but separated from conductive portions 19 and 21 on the inner surfaces of cavities 11 and 13, respectively.

Conductive portions 17 and 19 form two plates of a first variable capacitor $C_1$ separated at their centers by a distant $X_1$, and conductive portions 17 and 21 form two plates of a second variable capacitor $C_2$ separated at their centers by a distance $X_2$. Pressurized fluid, indicated by arrows $P_1$ and $P_2$, are provided by any suitable means 23 and 25 to cavities 11 and 13. The means 23 and 25 for providing pressures $P_1$ and $P_2$ to cavities 11 and 13 are preferably similar to the flexible isolators discussed in more detail in the Frick U.S. Pat. No. 4,370,890.

Preferably, temperature sensor 227 is positioned in or proximate to housing 7 to sense the temperature within the differential pressure sensor housing. Sensor 227 provides an analog output signal on line 29 for purposes to be explained.

Depending on the difference between pressures $P_1$ and $P_2$, diaphragm 15 deflects within chamber 9 toward either plate 19 or plate 21. This deflection causes a change in the reactive impedance, or capacitive, values of variable capacitors $C_1$ and $C_2$. Sensor 5, when driven by a measurement circuit, provides an output signal representative of the capacitive values of the variable capacitors $C_1$ and $C_2$ and stray capacitances of the sensor diagrammatically represented at $C_{S1}$ and $C_{S2}$. The measurement circuit provides an indication of the differential pressure based on the output signal.

However, variations in the line pressure applied to capacitive pressure sensor 5 imposes stresses on housing 7. For example, increased stress caused by increased line pressure causes a slight bulging of the sensor housing, thereby increasing the distances $X_1$ and $X_2$ between the capacitor plates, causing a decrease in the capacitive values of variable capacitors $C_1$ and $C_2$. This results in errors in the output signal of capacitive pressure sensor 5.

The effect of line pressure on the output of a capacitive differential pressure sensor has been found to be significant. In such sensors, change in line pressure results in deformation of the sensor housing as well as alteration of the pressure response characteristics of the center diaphragm of the sensor. These effects cause changes in the ratio of the reactive impedance, or capacitive, values of variable capacitors $C_1$ and $C_2$. Thus, errors result in the output signal. As an example, in some pressure sensors, span errors have been found to be approximately 1% change in output across an instrument span of 1000 pounds per square inch (psi) change in line pressure. Similar zero errors occur in the output signal at low, or zero differential pressure when the line pressure changes. To compensate for these errors, the aforementioned Frick U.S. application Ser. No. 7-677,380 provides compensation capacitors $C_{L1}$ and $C_{L2}$ in operative relationship to the variable capacitors $C_1$ and $C_2$ of the differential sensor so that the currents through compensation capacitors $C_{L1}$ and $C_{L2}$ subtract from the currents through variable capacitors $C_1$ and $C_2$. The compensation capacitors provide a reactive impedance, or capacitance, whose values are chosen to compensate the single output of the circuit for zero and span errors caused by variation in line pressure. Thus, and with reference to FIG. 2, correction is achieved in the signal at the output 220 of the feedback circuit. In contrast, the present invention generates plural signals, each of which is a different function of differential pressure and line pressure. The indication of differential pressure is digitally corrected for line pressure errors using the plural signals. Thus, correction is accomplished at the output 240 of the microprocessor, rather than at the input to the microprocessor.

Figure 2:
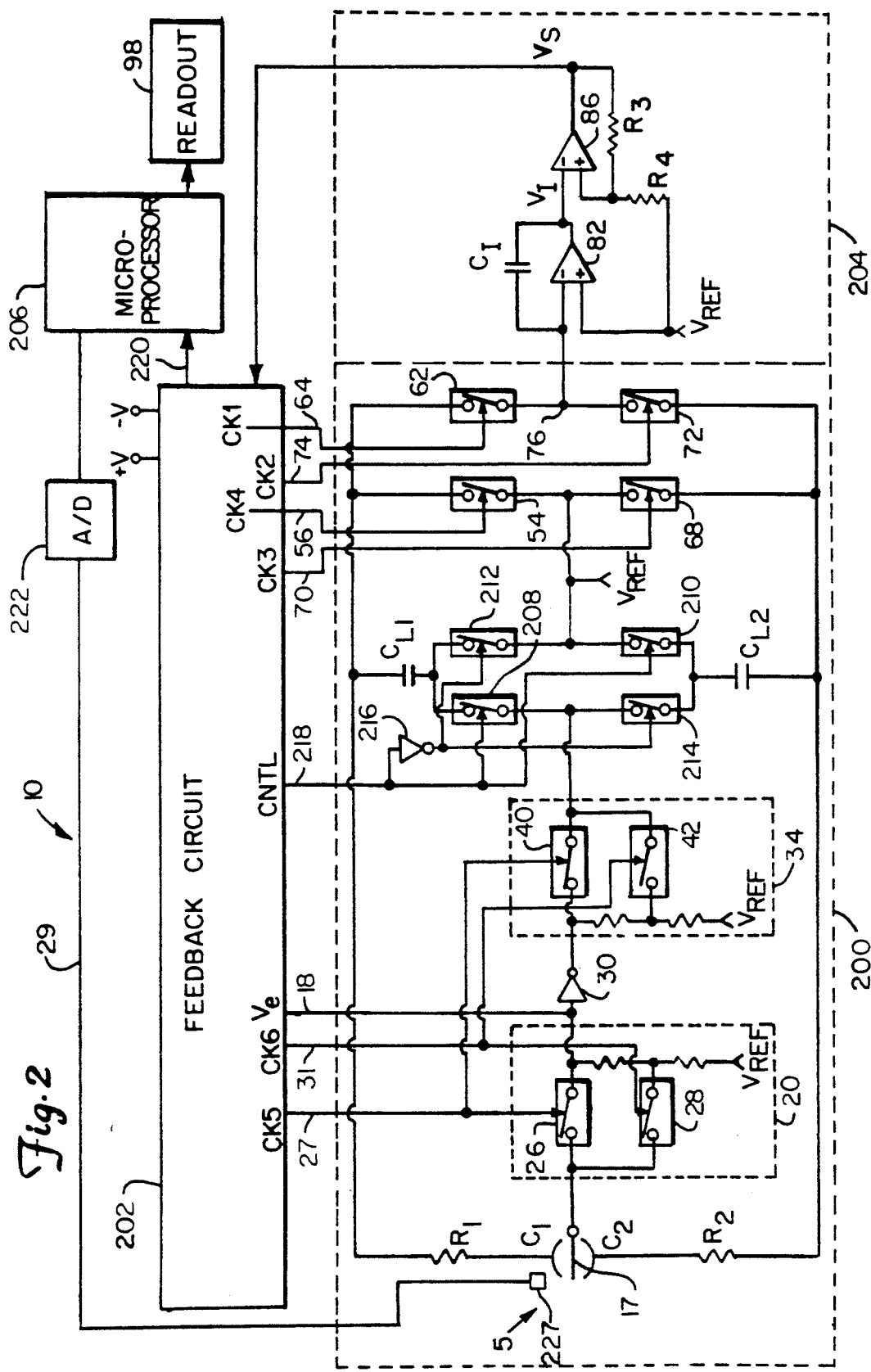
FIG. 2 is a schematic circuit diagram of the differential pressure sensor with the preferred embodiment of measurement circuit incorporating correction techniques according to the present invention.

The present invention provides a measurement circuit illustrated in FIG. 2 to correct line pressure error in the differential pressure signal by alternately and successively connecting a compensation impedance to the variable capacitors $C_1$ and $C_2$ of the differential sensor. As a result, a separate signal is derived from the charge packet counts based on the capacitance values during each successive alternate connection. The separate signals have different mathematical relationships in respect to each other as to both differential pressure and line pressure. The separate signals are processed to derive a differential pressure signal corrected for variations in line pressure.

The transfer function, $f_T$, used in differential pressure sensors, such as sensor 5, can be expressed as a ratio of the capacitance values of capacitors $C_1$ and $C_2$ and is directly proportional to the differential pressure, $\Delta P$. The transfer function ratio can be represented as:

$$f_T \propto \Delta P \propto \frac{C_1 - C_2 - K_1}{C_1 + C_2 - K_2} \qquad \text{Eqn. 1}$$

where $K_1$ and $K_2$ are line pressure compensator terms; $K_1$ compensates primarily for zero errors and $K_2$ compensates for span errors. Further, $$K_1 = C_{L1} - C_{L2}; \qquad \text{Eqn. 2}$$
$$K_2 = C_{L1} + C_{L2};$$

where $C_{L1}$ and $C_{L2}$ are the fixed capacitors that do not vary with line pressure. In the aforementioned Frick U.S. application, zero error compensation ($K_1$) is corrected by adjusting the values of the $C_{L1}$ and $C_{L2}$ capacitances as $$C_{L1} \approx C_{S1} + \Delta C \qquad \text{Eqn. 3}$$
$$C_{L2} \approx C_{S2} - \Delta C$$

where $C_{S1}$ and $C_{S2}$ are the capacitance values of the stray capacitance in the sensor and $\Delta C$ is the correction factor for static or line pressure. Likewise, span error compensation ($K_2$) is adjusted in a similar manner; both zero error compensation and span error compensation may be adjusted simultaneously. The present invention contemplates correction for line pressure through digital processing of the signals, rather than by use of selected compensation capacitors, although both techniques may be employed.

As shown in FIG. 1, capacitive sensor housing 5 is internally symmetrical about the center diaphragm 15, thereby dividing the inner chamber into two substantially equal pressure sensing cavities 11 and 13. In such an arrangement, the stray capacitances $C_{S1}$ and $C_{S2}$ are approximately equal to each other. In the preferred embodiment of the present invention, capacitor $C_{L1}$ is connected into operative relation to variable capacitor $C_1$ and its associated stray capacitance $C_{S1}$ during a first update cycle or iteration, and capacitor $C_{L2}$ is connected into operative relation to variable capacitor $C_2$ and its associated stray capacitance $C_{S2}$ during a second update cycle or iteration, with the connections alternating successively between the first and second update cycles. In the present invention, it is preferred that capacitors $C_{L1}$ and $C_{L2}$ are equal to each other and to twice the individual stray capacitances $C_{S1}$ or $C_{S2}$ to thereby compensate for stray capacitance:

$$C_{L1} = C_{L2} = C_{S1} + C_{S2} \qquad \text{Eqn. 4}$$

The capacitance sizes for compensation capacitors $C_{L1}$ and $C_{L2}$ are so chosen because of the operation of the circuit requires each compensation capacitor to be about twice the individual stray capacitance, and because the two stray capacitances are about equal to each other.

FIG. 2 shows the preferred embodiment of a charge balanced feedback transmitter 10 employing the compensation techniques according to the present invention. Transmitter 10 is designed for use with capacitive differential sensors, and is similar to the circuit illustrated in the Frick et al. U.S. Pat. No. 4,791,352, issued on Dec. 13, 1988 and assigned to the same assignee as the present invention, and particularly FIG. 1 thereof. The primary differences between circuit illustrated in FIG. 2 of the present application and the circuit shown in FIG. 1 of the aforementioned Frick et al. patent reside in (1) the provision of a switching arrangement to alternately and sequentially connect capacitors $C_{L1}$ and $C_{L2}$ into operative relationship with variable capacitors $C_1$ and $C_2$, respectively, during successive update cycles, and (2) the inclusion of microprocessor 206 to interpret the output signals from integrating and comparison circuit 204. Advantageously, a hysteresis circuit comprising resistors $R_3$ and $R_4$ is included in integrating and comparison circuit 204 for the reasons described in the Schulte et al. U.S. Pat. No. 4,878,012, issued on October 31, 1989 and assigned to the same assignee as the present invention. For sake of clarity, those components shown in FIG. 2 of the present application which are the same or similar to components shown and described in the aforementioned Frick et al. patent are designated with reference numerals as in the Frick et al. patent, whereas components which are unique to the present invention are designated with reference numeral of 200 and higher.

As described in Frick et al. U.S. Pat. No. 4,791,352, measurement circuit 10 is a two-wire transmitter. A charge packet generator circuit 200 generates quantities or packets of charge representative of the capacitance of variable capacitors $C_1$ and $C_2$ and supplies the charge packets to node 76 at the input to integrating and comparison circuit 204. Feedback circuit 202 provides the charging voltage $V_e$ and the timing of clock signals CK1 through CK6 for operating switches 54, 62, 68 and 72 and the switches in vernier circuits 20 and 34 to generate the charge packets and supply them to node 76, all as more fully described in the Frick et al. U.S. patent. Reference should be made to the aforementioned Frick et al. U.S. patent for a full discussion of the operation of the charge packet generator circuit 200 and of the feedback circuit 202 during each update cycle. According to the present invention, feedback circuit 202 additionally provides a control signal CNTL on lead 218 to operate switches 208 and 210 and to operate switches 212 and 214 through inverter 216, in the manner to be described in connection with FIG. 3.

Integrating and comparing circuit 204 includes an integrator consisting of amplifier 82 and capacitor $C_I$, and comparator 86 having a hysteresis circuit comprising resistors $R_3$ and $R_4$, which function is explained in the Schulte et al. U.S. Pat. No. 4,878,012. The charge is accumulated at node 76 and integrated into an analog signal by the integrator. Comparator 86 compares the signal from the integrator to a reference signal and provides a digital measurement output signal $V_s$ indicative of the accumulated charge on capacitor $C_I$ of the integrator, as described in the aforementioned Frick et al. U.S. patent.

Figure 3:
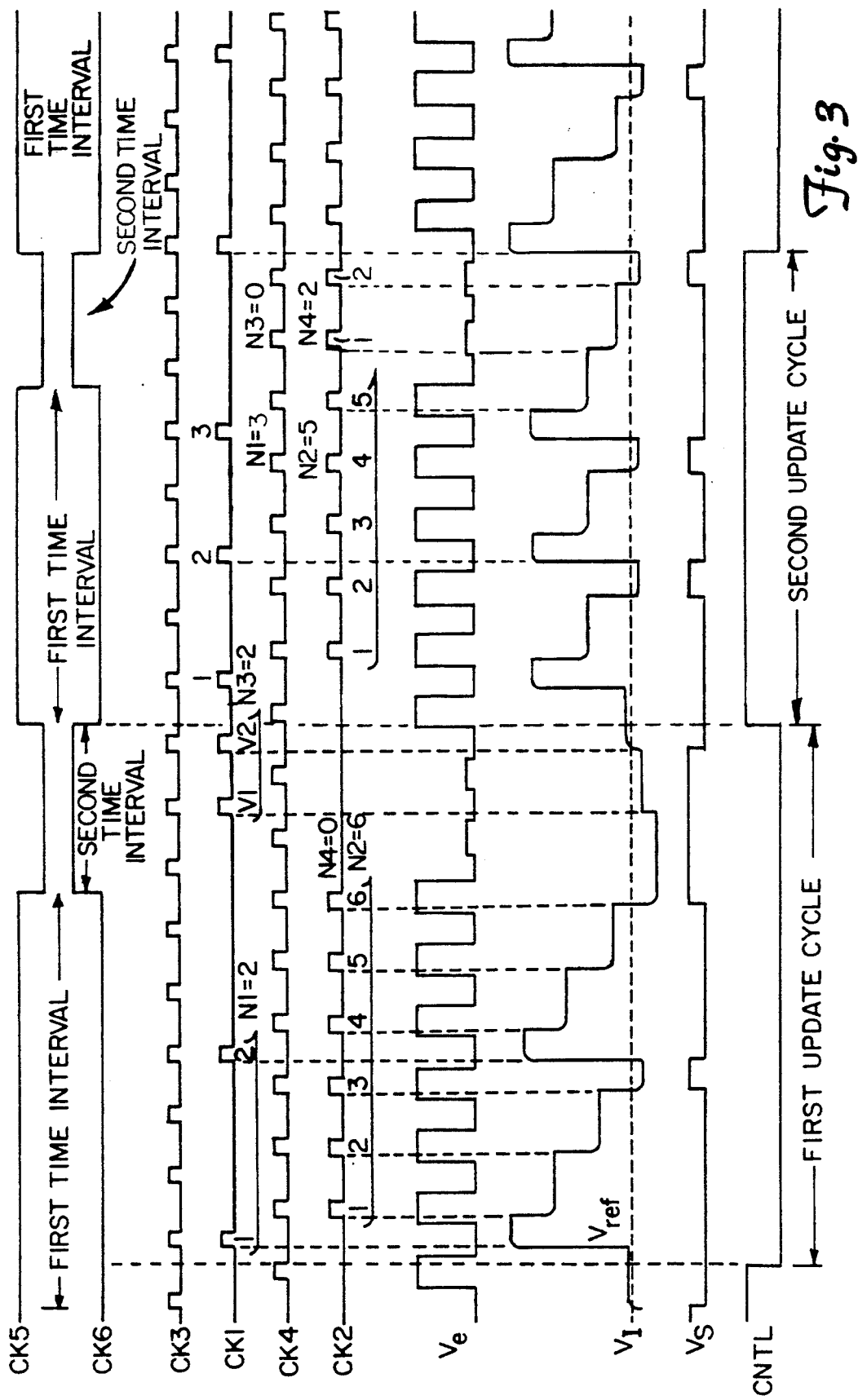
FIG. 3 is a timing diagram for the circuit illustrated in FIG. 2.

Output signal $V_s$ is supplied as an input to feedback circuit 202. Feedback circuit 202 is the same as the feedback circuit 50 shown and described in the aforementioned Frick et al. U.S. patent, except that feedback circuit 202 additionally includes logic that provides a control signal CNTL on lead 218. FIG. 3 illustrates the relationship of the clock signals CK1 through CK6, control signal CNTL and the voltage levels of the charging voltage $V_e$, voltage output $V_I$ from amplifier 82, and the output signal $V_s$ from integrating and comparing circuit 204.

As described in the Frick et al. patent measurement circuit 10 establishes a first time interval during which preliminary or coarse measurements occur, and a second time interval during which vernier or fine measurements occur. During the first time interval, signal CK5 on lead 27 closes switches 26 and 40 in vernier circuits 20 and 34 to apply the full excitation voltage $V_e$ to plate 17 of the capacitive sensor and through inverter 30 to capacitors $C_{L1}$ and $C_{L2}$. During the second time interval, signal CK6 on lead 31 closes switches 28 and 42 in the vernier circuits thereby dividing the excitation voltage through vernier circuit 20 for capacitive sensor 5 and through inverter 30 and vernier circuit 34 for capacitors $C_{L1}$ and $C_{L2}$. The present invention additionally establishes plural successive updates or iterations during each of which both first and second time intervals occur to derive coarse and fine measurement of differential pressure. During a first update cycle or iteration, switches 208 and 210 are open and switches 212 and 214 are closed. During a second update cycle, switches 208 and 210 are closed and switches 212 and 214 are open.

For purposes of explanation of the circuit illustrated in FIG. 2, and with reference to the timing diagram of FIG. 3, assume the measurement circuit is in a first update or iteration wherein switches 212 and 214 are closed and switches 208 and 210 are open, and assume further that the circuit is operating during a first time interval when the CK5 signal closes switches 26 and 40 to achieve coarse measurements. Signal CK3 on lead 70 from feedback circuit 202 closes switch 68 thus storing packets of charge on capacitors $C_2$ and $C_{L2}$. After the polarity of excitation voltage $V_e$ on lead 18 changes, signal CK4 on lead 56 closes switch 54 to store packets of charge on capacitor $C_1$. (Capacitor $C_{L1}$ is effectively isolated from the circuit due to the open condition of switch 208 and the closed state of switches 54 and 212.) After the polarity of excitation voltage $V_e$ again changes, signals CK1 and CK3 on leads 64 and 70 close switches 62 and 68, respectively. Switch 62 couples a packet of charge from capacitor $C_1$ to node 76 and integrating and comparison circuit 204. With switch 68 closed, packets of charge are stored on capacitors $C_2$ and $C_{L2}$. After the polarity of excitation voltage $V_e$ again changes, signal CK4 operates switch 54 to store packets of charge on capacitor $C_1$, and signal CK2 operates switch 72 to couple a packet of charge from capacitors $C_2$ and $C_{L2}$ to integrating and comparison circuit 204.

The operation of the circuit is similar during the second time interval when the vernier or fine measurements occur, except that the excitation voltage $V_e$ is derived through voltage dividers in vernier circuits 20 and 34, and is low.

Integrating and comparison circuit 204 responds to the packets of charge received from node 76 to provide output signal $V_s$, as more fully described in the Frick et al. U.S. Pat. No. 4,791,352.

As shown in FIG. 3, during the first iteration or update measurement cycle of sensor 5, signal CNTL on lead 74 is in a first state to open switches 208 and 210 and, through inverter 216, to close switches 212 and 214. Thus, during the first update cycle capacitor $C_{L1}$ is effectively out of the circuit and capacitor $C_{L2}$ is effectively in the circuit. During the second update cycle, signal CNTL is in a second state and the conditions of switches 208–214 are reversed, so that capacitor $C_{L2}$ is effectively out of the circuit while capacitor $C_{L1}$ is effectively in the circuit. Switches 208–214 alternately connect capacitor $C_{L1}$ into operative relation to capacitor $C_1$, and capacitor $C_{L2}$ into operative relation to capacitor $C_2$. Hence, fixed compensation capacitors are successively switched into operative relation with capacitors $C_1$ and $C_2$ during successive updates or iterations. During the respective first and second update cycles when the respective fixed capacitor $C_{L1}$ or $C_{L2}$ is in operative relation to the respective sensing capacitor $C_1$ or $C_2$, the respective fixed capacitor $C_{L1}$ or $C_{L2}$ is charged oppositely to the charging of the respective sensing capacitor $C_1$ or $C_2$ due to inverter 30. Consequently, the currents through fixed capacitors $C_{L1}$ and $C_{L2}$ are opposite to the currents through sensing capacitors $C_1$ and $C_2$ and their stray capacitances, respectively. Hence, the currents through fixed capacitors $C_{L1}$ and $C_{L2}$ are algebraically summed, or subtracted, with the currents through sensing capacitors $C_1$ and $C_2$ and their stray capacitances.

As explained in the Frick et al. U.S. Pat. No. 4,791,352, charge packets from capacitors $C_1$, $C_2$, $C_{L1}$, and $C_{L2}$ are coupled to and accumulated at node 76 to produce output signal $V_s$ from integrating and comparison circuit 204. Output signal $V_s$ operates logic within feedback circuit 202 to count the pulses on lines 64 and 74 to thereby count the number of charge packets accumulated at node 76. Counts N1 and N2, representative of the number of charge packets of opposite polarity, are accumulated during the first time interval (coarse measurement) and counts N3 and N4 are accumulated during the second time interval (fine measurement). Thus, count N1 is the number of charge packets of a first polarity coupled from capacitors $C_1$ and $C_{L1}$ during the first time interval, count N2 is the number of charge packets of a second polarity opposite the first polarity coupled from capacitors $C_2$ and $C_{L2}$ during the first time interval, count N3 is the number of charge packets of the first polarity coupled from capacitors $C_1$ and $C_{L1}$ during the second time interval, and count N4 is the number of charge packets of the second polarity coupled from capacitors $C_2$ and $C_{L2}$ during the second time interval. The charge packets accumulate at node 76 in a manner tending toward a charge-balanced condition. The counts N1 and N2 on lines 64 and 74 during the first time interval are a function of differential pressure sensed by sensor 5, and the counts N3 and N4 on lines 64 and 74 are also a function of differential pressure sensed by sensor 5. Microprocessor 206 calculates the differential pressure using counts N1 and N2 and the counts N3 and N4 via line 220. As will be explained below, the counts N1 and N2 and the counts N3 and N4 may be different during each update cycle or iteration, the difference being a function of static or line pressure. Microprocessor 206 corrects the differential pressure signal using the relationships of N1 and N2 and the relationships of N3 and N4 during the successive iterations and provides an output to readout circuit 98 which is representative of differential pressure. Readout circuit 98 provides such readout and/or control as may be desired.

As explained in the Frick et al. U.S. Pat. No. 4,791,352, the total number of counts N1 and N2 is constant for each first time interval, and the total number of counts N3 and N4 is constant for each second time interval. Thus, $|N1+N2|_{max}=K_{f1}$ and $|N3+N4|_{max}=K_{f2}$, where $K_{f1}$ and $K_{f2}$ are constants. Logic within feedback circuit 202 is responsive to $N3+N4=K_{f2}$ to change the state of control signal CNTL on line 218 to reverse the state of switches 208, 210, 212 and 214. Hence, the apparatus according to the present invention changes between its first and second update cycles upon the conclusion of each second time interval. It is not important to the present invention to identify which update cycle employs capacitor $C_{L1}$ and which employs capacitor $C_{L2}$. It is only important that microprocessor 206 process the counts N1 and N2 (and/or N3 and N4) during different update cycles. The microprocessor processes the signals representative of each update cycle using the polynomial or lookup table as herein described.

As described above, the counts N1, N2, N3 and N4 may be different during each update cycle, but the sums $K_{f1}$ and $K_{f2}$ are constant during each update cycle. This is illustrated in FIG. 3 where during the first update cycle N1=2 and N2=6 ($K_{f1}=8$), and during the second update cycle N1=3 and N2=5 ($K_{f1}=8$). Likewise, during the first update cycle N3=2 and N4=0 ($K_{f2}=2$), and during the second update cycle N3=0 and N4=2 ($K_{f2}=2$). (It is understood that the example of $K_{f1}=8$ and $K_{f2}=2$ is given for explanation of operation of the invention, and that in practice the constants $K_{f1}$ and $K_{f2}$ may be numbers in the hundreds or even thousands.)

Capacitors $C_{L1}$ and $C_{L2}$ are alternately switched into operative relation with capacitors $C_1$ and $C_2$ so that the currents through capacitors $C_{L1}$ and $C_{L2}$ subtract from the currents through the sensor capacitances $C_1$ and $C_2$ during the successive update cycles or iterations. As a result, the sensor and fixed capacitors exhibit different relationships with the charge packet counts during each update cycle, the relationships being $$N_1(C_1 - C_L) \approx N_2 C_2 \qquad \text{Eqn. 5}$$

for the first update cycle, and $$N_1 C_1 \approx N_2(C_2 - C_L) \qquad \text{Eqn. 6}$$

for the second update cycle, where $C_L = C_{L1} = C_{L2} \approx C_{S1} + C_{S2}$.

To achieve equations 5 and 6, in accordance with the present invention a fixed capacitor is alternately connected in operative relationship with the sensor capacitances $C_1$ and $C_2$ during each update or iteration. There may be one or a plurality of fixed capacitors, and (if there are a plurality of fixed capacitors) they may be equal or unequal to each other. Further, the fixed capacitors may be electrically switched in and out of the circuit, or they may be hard-wired into the circuit and electrically isolated when not required. Conveniently, the fixed capacitors may also serve to compensate for stray capacitance in the sensor. In the embodiment shown in FIG. 2, there are two fixed capacitors which are equal in value and are electrically switched in and out of the circuit. The capacitance value of each fixed capacitor is equal to twice the stray capacitance $C_{S1}$ or $C_{S2}$ ($C_{S1}$ being approximately equal to $C_{S2}$) to compensate for stray capacitance.

Capacitors $C_{L1}$ and $C_{L2}$ are alternately switched into operative relationship with variable capacitors $C_1$ and $C_2$ at the pulse rate of the CNTL signal, which changes binary value immediately following the beginning of the first time interval of each update or iteration of sensor measurement. A minimum of two update cycles are required to derive the differential pressure signal.

The uncorrected differential pressure, $\Delta P$ (uncorrected for line pressure), is a function of an average of the outputs of the circuit of FIG. 2 during the first and second update cycles, whereas the line pressure is a function of the difference of the outputs of the circuit of FIG. 2. The corrected differential pressure is a function of the uncorrected differential pressure and the line pressure. The uncorrected differential pressure may be expressed as $$\Delta P \approx \frac{C_1 - C_2}{C_1 + C_2 - C_L}, \text{ or} \qquad \text{Eqn. 7}$$

$$\approx \frac{C_1 - C_2}{C_1 + C_2}, \text{ where } C_L < < (C_1 + C_2)$$

Sensor 5, which contains an oil dielectric, exhibits changes in cavity depth and changes in dielectric constant, each resulting from and each being roughly proportional to the line pressure, $P_S$. Changes in cavity depth and dielectric constant cause changes in the capacitive values of capacitors $C_1$ and $C_2$. It can be shown that the difference between the outputs of the circuit during the first and second update cycles is a function of line pressure, $P_S$, the relationship being $$P_S \propto \frac{C_L}{C_1 + C_2 - C_L} - A, \text{ or} \qquad \text{Eqn. 8}$$

$$\propto \frac{C_L}{C_1 + C_2} - A, \text{ where } C_L < < (C_1 + C_2)$$

where A is a constant.

Equation 8 shows that the sum of the variable capacitance values is an inverse function of the line pressure. A correction value is derived based on equation 8 to modify the value of the differential pressure signal based on equation 7.

Preferably, the differential pressure signal is corrected by processing the results of the measurements of the two update cycles or iterations in microprocessor 206 to solve the polynomial series $$Q = a + bx + cx^2 + \ldots \qquad \text{Eqn. 9}$$

in the manner described in the Cucci U.S. Pat. No. 4,598,381, issued on Jul. 1, 1986 and assigned to the same assignee as the present invention. To this end, a temperature signal is provided by temperature sensor 227 operating through analog-to-digital converter 222 to microprocessor 206. Employing the teachings of the Cucci Patent, microprocessor 206 processes signals which are a function of differential pressure (equation 7), line pressure (equation 8) and temperature using the polynomial series of Equation 9 to thereby correct the differential pressure signal for temperature and line pressure. In particular, microprocessor 206 processes the signals based on the relationships of Equations 7 and 8, together with a digitized temperature signal, to derive a corrected differential pressure signal which is independent of variations in line pressure and temperature. Microprocessor 206 provides an output to readout 98 representative of the differential pressure signal corrected for errors due to line pressure and temperature.

As an alternative to the polynomial series calculation, the correction may be accomplished through a lookup table in the memory of microprocessor 206; the table being empirically derived by measuring the output relationship at various line pressures and operating temperatures in a test or calibration environment and storing the results in a lookup table in the memory of microprocessor 206. In the field, signals based on the relationships set forth in Equations 5 and 6 are derived and compared to the lookup table entries to select the corrected differential pressure signal output.

It will be appreciated that although capacitors $C_{L1}$ and $C_{L2}$ are illustrated and described as each equal to twice the stray capacitance $C_{S1}$ or $C_{S2}$, the capacitors may be any value and need not be equal. It is preferred, however, that the capacitors compensate for stray capacitance in the manner described in the Schulte et al. U.S. Pat. No. 4,878,012, and the capacitors should not be so large as to adversely affect the approximations of equations 7 and 8. It may be desired, for example, to provide unequal capacitors $C_{L1}$ and $C_{L2}$ to compensate for stray capacitance in an unbalanced or deformed sensor, or to compensate for line pressure in the manner taught in the Frick U.S. application Ser. No. 7-667,380 before correction as described herein.

Although two capacitors $C_{L1}$ and $C_{L2}$ are shown in FIG. 2, any number may be employed. For example, three or four capacitors may be employed for unequal capacitor applications, two of which compensate for stray capacitance and one or two of which provide compensation for an unbalanced sensor or for line pressure. It might be convenient to employ one capacitor which is alternately switched into operative relationship with each of the two variable capacitors $C_1$ and $C_2$. Further, actual switching of the capacitors may be accomplished in any convenient manner which assures that the capacitors are properly charged and are isolated to prevent interference with the operation or compensation of either sensor capacitor.

If desired, capacitors $C_{L1}$ and $C_{L2}$ may be chosen with temperature coefficients substantially equal to the temperature coefficient of the dielectric oil in the sensor capacitors $C_1$ and $C_2$. If capacitors $C_{L1}$ and $C_{L2}$ are so chosen, they are preferably mounted to an internal portion of housing 7 of sensor 5. As a result, the capacitors would be subject to the same thermal changes as are imposed on sensor capacitors $C_1$ and $C_2$, and may be employed to compensate for thermal changes as well as effects of stray capacitance.

The circuit of FIG. 2 may alternatively be used to correct differential pressure signals for variations in temperature. The two $V_S$ output signals supplied during the two update cycles or intervals each differently represent the differential pressure, line pressure and temperature. Thus, it can be shown that the signal from the capacitive sensor of FIG. 2 varies with variations in temperature as a function of $1/(C_1+C_2)$. By empirically adjusting the constants of Equation 9, the differential pressure signal may be corrected for variations in temperature instead of line pressure. Thus, microprocessor 206 processes the $N_1$ and $N_2$ counts as described above, except that the constants of the polynomial are adjusted to correct for temperature variations instead of line pressure. Alternatively, temperature correction may be accomplished through use of a lookup table as described above.

As described above, the two input signals on line 220 are each functions of differential pressure, static pressure and temperature. If a temperature sensor (such as temperature sensor 227) is employed to measure one of the variables, the values of the other two variables can be derived and output. Thus, with temperature sensor 227, the value of static pressure can be calculated, in addition to differential pressure. Alternatively, if variations of the output signal is negligible due to one of the variables (the output signal being a weak function of that variable), the values of the other two variables may be derived and output with adequate accuracy from the two input signals on line 220, without the use of a separate sensor.

The present invention may also be employed with piezoresistive sensor apparatus to sense differential pressure and correct for errors due to line pressure, or to sense line pressure and correct for errors due to temperature. FIG. 4 is a block circuit diagram of a typical sensor arrangement comprising a piezoresistive bridge 150 having piezoresistive elements $R_5$, $R_6$, $R_7$ and $R_8$ on a silicon surface. In a typical arrangement, bridge 150 was arranged as a differential pressure sensing bridge responsive to the difference between two pressures $P_1$ and $P_2$. Piezoresistive elements $R_5$ and $R_6$ on opposite sides of the bridge were responsive to the differential pressure in one sense (e.g., positively) and piezoresistive elements $R_7$ and $R_8$ on opposite sides of the bridge were responsive to the differential pressure in an opposite sense (e.g., negatively). Bridge 150 was powered by a DC energizing voltage $V_c$ connected on one side to the junction between piezoresistive elements $R_5$ and $R_8$ and on the other side to the junction between piezoresistive elements $R_6$ and $R_7$. The piezoresistive elements responded to the differential pressure to alter the bridge balance to provide an output signal to analog-to-digital convertor 152 representative of the differential pressure. The output from convertor 152 was provided to a microprocessor (not shown in FIG. 4).

As a static or line pressure sensing apparatus, bridge 150 was responsive to line pressure in such a manner that opposite piezoresistive elements $R_5$ and $R_6$ varied in one sense (e.g., positively) to line pressure and opposite piezoresistive elements $R_7$ and $R_8$ responded in an opposite sense (e.g., negatively) to line pressure. Changes in line pressure on the piezoresistive elements of bridge 150 altered the bridge balance to provide an output signal to analog-to-digital convertor 152 representative of the line pressure. The output from convertor 152 was provided to the microprocessor.

In some cases, it was common to provide two bridges 150, one to sense line pressure and the other to sense differential pressure in the manner as described above. In either case, it was also common to provide a temperature sensitive resistor $R_T$ in direct contact with the pressurized fluid to provide a signal representative of temperature through analog-to-digital convertor 154 to the microprocessor. Thus, the output of analog-to-digital convertor 154 was a function of the temperature of fluid applied to bridge 150. The outputs of the bridge or bridges 150 and of temperature sensitive resistor $R_T$ were functions of differential pressure and/or line pressure and temperature. Therefore, differential pressure measurements could be corrected for variations in line pressure and temperature, and line pressure measurements could be corrected for variations in temperature.

However, the prior apparatus required a dedicated analog-to-digital converter for each sensor, so correction of a line pressure bridge required two converters and correction of a differential pressure bridge required three converters, each converter providing sensor input to a processor. To eliminate the requirement for plural converters, multiplexing techniques were used to alternately connect the separate sensor outputs to a single converter, but multiplexing held the disadvantage that alternate connection of the several sensor information signals to the converter resulted in the loss of information.

The present invention permits transmission of signals representative of two variables, such as differential pressure and line pressure, or line pressure and temperature, through a single analog-to-digital converter with minimum loss of information and minimum aliasing errors. A circuit performing these functions is illustrated in FIG. 5 wherein a typical piezoresistive sensing bridge 160 is shown having variable piezoresistive elements $R_9$, $R_{10}$, $R_{11}$ and $R_{12}$, energized by a DC energizing voltage $V_e$. The output of bridge 160 provides input to analog-to-digital convertor 230, which in turn provides an output to microprocessor 206 (which may be of the same character as the microprocessor illustrated in FIG. 2). Converter 230 also provides an output to feedback 232 to provide a control signal CNTL (see FIG. 3) on line 210. The control signal on line 210 provides first and second update cycle pulses, shown as the CNTL signal in FIG. 3, to operate switch 234 and, through inverter 236, switch 238. Fixed resistor $R_{13}$ is connected between the junction of resistors $R_{10}$ and $R_{11}$ of bridge 160 and the junction between switches 234 and 238 so that during a first update cycle switch 234 is closed and switch 238 is open, and resistor $R_{13}$ is connected into parallel relationship with piezoresistive element $R_{10}$. During a second update cycle, switch 234 is open and switch 238 is closed, and resistor $R_{13}$ is connected into parallel relationship with piezoresistive element $R_{11}$.

In the case where bridge 160 is arranged to measure differential pressure, the signal output from the bridge varies with differential pressure and line pressure. Resistor $R_{13}$ is a fixed resistor whose temperature coefficient is preferably, but not necessarily, substantially equal to the temperature coefficients of piezoresistive elements $R_9$–$R_{11}$. During the first cycle, fixed resistor $R_{13}$ is in parallel relationship to piezoresistive element $R_{10}$, so analog-to-digital convertor 230 provides a first output signal which is a function of both differential pressure and line pressure. During the second cycle, when resistor $R_{13}$ is in parallel relationship with piezoresistive element $R_{11}$, convertor 230 provides a second output signal which is also a function of differential pressure and line pressure. However, the second output signal is different from the first output signal. Microprocessor 206 processes the first and second output signals through a polynomial series of Equation 9, or by reference to a lookup table, as previously described to provide a corrected differential pressure output signal to readout or display device 98, the corrected output signal being corrected for errors due to variations in line pressure.

In the case where bridge 160 is arranged to provide a measurement of line pressure, resistor $R_{13}$ is selected for a temperature coefficient different from the temperature coefficients of piezoresistive elements $R_9$–$R_{12}$, and is preferably zero. The result is that the outputs of convertor 230 during the first and second update cycles are different functions of both the line pressure and temperature. As in the case of measuring differential pressure, microprocessor 206 processes the signals employing the polynomial series of Equation 9 or a lookup table as previously described to provide a corrected gauge or absolute pressure output display of the line pressure for readout 98.

In the embodiments of FIG. 5, the structure of the bridge sensors as a differential pressure sensor or a line pressure sensor is determinative of whether the circuit operates to measure differential pressure or line pressure. The selection of the temperature coefficient of fixed resistor $R_{13}$ is also important to the effect on the variables reflected in the bridge output signals. In the case of measuring differential pressure, the output signals should be functions of differential pressure and line pressure. In such a case, it is preferred, but not necessary, that the temperature coefficient of fixed resistor $R_{13}$ substantially match the temperature coefficients of piezoresistive elements $R_9$–$R_{12}$ in order to compensate for temperature changes as well as possible, thereby minimizing the effects of temperature variations on the sensor.

In the case of measuring line pressure, the output signals should be functions of line pressure and temperature, so it is important that fixed resistor $R_{13}$ not respond to temperature changes in the sensor. Thus, in the case of line pressure measurement, the temperature coefficient of fixed resistor $R_{13}$ should be different from the temperature coefficients of piezoresistive elements $R_9$–$R_{12}$ to assure that the output signals are functions of line pressure and temperature of the sensor. Preferably, the temperature coefficient of fixed resistor $R_{13}$ is zero.

The piezoresistive bridges 160 may be half-bridges employing only two piezoresistive elements. Thus the two piezoresistive elements of a differential pressure half-bridge would each be responsive to one of the pressures being monitored to provide an output signal representative of the difference between them. The two piezoresistive elements of a line pressure half-bridge would each be responsive to line pressure as to change the impedance of one piezoresistive element positively and to change the impedance of the other piezoresistive element negatively.

The present invention provides for transmission of signals representative of two variables, such as differential pressure and line pressure, or line pressure and temperature, through a single analog-to-digital converter with minimum loss of information and minimum aliasing errors. One form of the invention provides for the operation of the variable sensor capacitors to obtain plural distinct relationships, the average of which is a function of differential pressure and the difference of which is a function of line pressure. Other forms of the invention provide for the operation of piezoresistive bridges to derive signals representative of two relationships. The relationships are used to derive a corrected signal which provides an accurate measurement of differential or line pressure.

Although the present invention has been described with reference to the preferred embodiment, workers skilled in the art will recognize that changes may be made in form and detail without departing from the spirit and scope of the invention.

What is claimed is:

1. Apparatus for measuring pressure, comprising:
   a pressure sensor comprising at least first and second sensing means each having an impedance value which varies with pressure and with a predetermined environmental condition;
   impedance means having an impedance value which is substantially unchanged by changes in the predetermined environmental condition;
   connection means for alternately connecting the impedance means into operative relation with the first and second sensing means, successively, the sensor and impedance means together providing first and second signals during respective alternative connection of the impedance means with the first and second sensing means, the first and second signals being functions of pressure and the predetermined environmental condition; and
   correction means responsive to the first and second signals for correcting a pressure indication for variations of the predetermined environmental condition based upon the first and second signals.

2. The apparatus of claim 1 wherein said impedance means has an impedance value selected for compensating the pressure signal for stray indication in said pressure sensor.

3. The apparatus of claim 1 wherein the pressure sensor measures differential pressure, the first and second signals are functions of differential pressure and line pressure, the impedance means has an impedance value which is substantially unchanged by changes in line pressure, and the correction means corrects the value of differential pressure for variations in line pressure.

4. The apparatus of claim 3 wherein the first and second sensing means have a temperature coefficient, the impedance means being thermally proximate the pressure sensor and having a temperature coefficient substantially equal to that of the first and second sensing means.

5. The apparatus of claim 3 further including temperature sensing means for sensing the temperature of said pressure sensor, the temperature sensing means providing a temperature signal, said correction means being further responsive to said temperature signal to correct the value of differential pressure for variations in temperature.

6. The apparatus of claim 3 wherein said correction means includes a processor programmed to calculate differential pressure in accordance with a polynomial series whose variables are based on an average of the first and second signals and the difference between the first and second signals.

7. The apparatus of claim 6 further including temperature sensing means for sensing the temperature of said pressure sensor, the temperature sensing means providing a temperature signal, said processor being programmed to calculate differential pressure in accordance with a polynomial series whose variables are based on an average of the first and second signals, the difference between the first and second signals and the temperature signal.

8. The apparatus of claim 3 wherein said correction means includes a processor programmed to identify differential pressure from a lookup table based on the average of the first and second signals and the difference between the first and second signals.

9. The apparatus of claim 8 further including temperature sensing means for sensing the temperature of said pressure sensor, the temperature sensing means providing a temperature signal, said processor being programmed to identify differential pressure from a lookup table based on the average of the first and second signals, the difference between the first and second signals and the temperature signal.

10. The apparatus of claim 3 wherein said pressure sensor is a capacitive pressure sensor and the first pressure sensing means has a capacitance value $C_1$ and the a second pressure sensing means has a capacitance value $C_2$, $C_1$ and $C_2$ varying with pressure, said impedance means comprises capacitive means having a capacitive value $C_L$, and said correction means correcting the value of differential pressure based on $C_L/(C_1+C_2)$.

11. The apparatus of claim 10 wherein said capacitive means comprises first and second capacitors, and said connection means alternately connects said first capacitor to said first pressure sensing means and said second capacitor to said second pressure sensing means.

12. The apparatus of claim 10 wherein the capacitive pressure sensor means comprises:
a housing having a cavity;
oil filling the cavity;
a diaphragm extending across the cavity dividing the cavity into first and second chambers, the diaphragm having at least one conductive portion forming a first plate;
a second conductive portion coupled to the first chamber and spaced from the conductive portion of the diaphragm by a distance $X_1$ to form a second plate of the first pressure sensing means; and
a third conductive portion coupled to the second chamber and spaced from the conductive portion of the diaphragm by a distance $X_2$ to form a second plate of the second pressure sensing means.

13. The apparatus of claim 12 wherein the first and second pressure sensing means have a temperature coefficient, the capacitive means being mounted to said housing and having a temperature coefficient substantially equal to that of the first and second pressure sensing means.

14. The apparatus of claim 12 wherein said capacitive means has a capacitance value selected for compensating the differential pressure signal due to stray capacitance in said housing.

15. The apparatus of claim 12 wherein said capacitive means comprises first and second capacitors, and said connection means alternately connects said first capacitor to said first pressure sensing means and said second capacitor to said second pressure sensing means.

16. The apparatus of claim 3 wherein the first pressure sensing means is a first piezoresistive pressure sensing means having a resistance value which varies with differential pressure in a first manner and the second pressure sensing is a second piezoresistive pressure sensing means having a resistance value which varies with differential pressure in a second manner, the first and second manners being different.

17. The apparatus of claim 16 wherein said correction means includes a processor programmed to calculate differential pressure in accordance with a polynomial series whose variables are based on an average of the first and second signals and the difference between the first and second signals.

18. The apparatus of claim 16 wherein said correction means includes a processor programmed to identify differential pressure from a lookup table based on the average of the first and second signals and the difference between the first and second signals.

19. The apparatus of claim 16 wherein the first and second piezoresistive pressure sensing means have a known temperature coefficient and the impedance means comprises a resistor thermally proximate the pressure sensing means and having a temperature coefficient which is the substantially the same as the temperature coefficient of the first and second piezoresistive pressure sensing means.

20. The apparatus of claim 1 wherein the pressure sensor measures differential pressure, the first and second signals are functions of differential pressure and temperature, the impedance means has an impedance value which is substantially unchanged by changes in temperature, and the correction means corrects the value of differential pressure for variations in temperature.

21. The apparatus of claim 20 wherein said pressure sensor is a capacitive pressure sensor and the first pressure sensing means has a capacitance value $C_1$ and the a second pressure sensing means has a capacitance value $C_2$, $C_1$ and $C_2$ varying with pressure, said impedance means comprises capacitive means having a capacitive value $C_L$, and said correction means correcting the value of differential pressure based on $C_L/(C_1+C_2)$.

22. The apparatus of claim 21 wherein said capacitive means comprises first and second capacitors, and said connection means is connected to said first and second capacitors to alternately connect said first capacitor into operative connection to said first pressure sensing means and said second capacitor into operative connection to said second pressure sensing means.

23. The apparatus of claim 20 wherein the first pressure sensing means is a first piezoresistive pressure sensing means having a resistance value which varies in a first manner with pressure and the second pressure sensing is a second piezoresistive pressure sensing means having a resistance value which varies in a second manner with pressure, the first and second manners of variation being different, the first and second piezoresistive pressure sensing means each having a known temperature coefficient, and said impedance means comprises a resistor having a temperature coefficient which is different from the temperature coefficient of the first and second piezoresistive pressure sensing means.

24. The apparatus of claim 1 wherein the pressure sensor measures line pressure and the impedance values of the first and second sensing means vary with line pressure in different manners and vary with temperature, the first and second signals are functions of line pressure and temperature, the impedance means has an impedance value which is substantially unchanged by changes in temperature, and the correction means corrects the value of line pressure for variations in temperature.

25. The apparatus of claim 24 wherein the first pressure sensing means is a first piezoresistive pressure sensing means having a resistance value which varies in a first manner with line pressure and the second pressure sensing is a second piezoresistive pressure sensing means having a resistance value which varies in a second manner with line pressure, the first and second manners of variation being different, the first and second piezoresistive pressure sensing means each having a known temperature coefficient.

26. A capacitive pressure sensor for sensing differential pressure in a two-wire transmitter, comprising:
a capacitive pressure transducer having first and second pressure sensors each having a capacitive value varying with variations in pressure and being suitable for being exposed to first and second pressures;
fixed capacitor means having a capacitance value which is substantially unchanged by variations in line pressure;
a switch alternately connecting the fixed capacitor means into operative relation with the first and second pressure sensors, successively, the transducer and fixed capacitor means together providing first and second signals respectively during alternative connection of the fixed capacitor means with the first and second pressure sensors, the first and second signals being functions of a differential pressure between the first and second pressures and line pressure; and
a correction circuit responsive to the first and second signals for correcting a differential pressure signal for variations in line pressure based upon the first and second signals.

27. The capacitive pressure sensor of claim 26 wherein said first pressure sensor has a capacitance value $C_1$ and said second pressure sensor has a capacitance value $C_2$, $C_1$ and $C_2$ varying with pressure, said fixed capacitor means has a capacitance value $C_L$, and said correction circuit includes means for correcting the value of differential pressure based on $C_L/(C_1+C_2)$.

28. The capacitive pressure sensor of claim 26 wherein said fixed capacitor means has a capacitance value selected for compensating the differential pressure signal due to stray capacitance in said transducer.

29. The capacitive pressure sensor of claim 26 wherein said fixed capacitor means comprises first and second capacitors, and said switch means is connected to said first and second capacitors to alternately connect said first capacitor to said first pressure sensor and said second capacitor to said second pressure sensor.

30. The capacitive pressure sensor of claim 26 further including temperature sensing means for sensing the temperature of said transducer, the temperature sensing means providing a temperature signal, said correction means being further responsive to said temperature signal.

31. The capacitive pressure sensor of claim 30 wherein said correction circuit includes a processor programmed to correct the differential pressure signal in accordance with a polynomial series whose variables are based on an average of the first and second signals, the difference between the first and second signals and the temperature signal.

32. The capacitive pressure sensor of claim 30 wherein said correction means is a processor programmed to correct the differential pressure signal from a lookup table based on an average of the first and second signals, the difference between the first and second signals and the temperature signal.

33. A method of measuring a pressure differential comprising the steps:
sensing a differential pressure with a first pressure sensing means which provides a first value representative of pressure and a predetermined environmental condition and with a second pressure sensing means which provides a second value representative of pressure and the predetermined environmental condition;
providing a fixed means having a value which is substantially fixed in relation to variations in the predetermined environmental condition;
deriving first and second relationships between said first and second pressure sensing means and said fixed means, the first and second relationships being different from each other wherein the first and second relationships are derived by alternately connecting the fixed means into operative relationship with the first and second pressure sensing means;
deriving an indication of differential pressure from said first and second relationships, said indication being representative of differential pressure sensed by said first and second pressure sensing means and independent of variations in the predetermined environmental condition.

34. The method of claim 33 wherein the predetermined environmental condition is line pressure, and the fixed means has a value which is substantially fixed in relation to variations in line pressure, the method further including sensing the temperature of said first and second pressure sensing means, said step of deriving the indication of differential pressure includes correcting for variations in temperature.

35. The method of claim 34 wherein said indication of differential pressure is derived by processing signals based on said first and second relationships and on the sensed temperature in accordance with a polynomial series whose variables are functions of said first and second relationships and the sensed temperature.

36. The method of claim 34 wherein said indication of differential pressure is derived by processing signals based on said first and second relationships in accordance with a lookup table based on the signals and on temperature.

37. The method of claim 33 wherein the predetermined environmental condition is temperature, and the fixed means has a value which is substantially fixed in relation to variations in temperature, and the step of deriving the indication of differential pressure includes correcting for variations in temperature.

38. The method of claim 37 wherein said indication of differential pressure is derived by processing signals based on said first and second relationships and in accordance with a polynomial series whose variables are functions of said first and second relationships.

39. The method of claim 37 wherein said indication of differential pressure is derived by processing signals based on said first and second relationships in accordance with a lookup table based on the signals.

40. The method of claim 33 wherein said indication of differential pressure is derived by processing a signal based on the average of the first and second relationships and a signal based on the difference between the first and second relationships in accordance with a polynomial series.

41. The method of claim 33 wherein said indication of differential pressure is derived by processing a signal based on the average of the first and second relationships and a signal based on the difference between the first and second relationships in accordance with a lookup table.

42. A method of measuring a line pressure comprising the steps:

sensing a line pressure with a first pressure sensing means which provides first a value representative of line pressure and with a second pressure sensing means which provides a second value representative of line pressure, said first and second values being different, the values of the first and second pressure sensing means also being responsive to temperature;

providing a fixed means having a value which is substantially fixed in relation to variations in temperature;

deriving first and second relationships between said first and second pressure sensing means and said fixed means, the first and second relationships being different from each other;

deriving an indication of line pressure from said first and second relationships, said indication being independent of variations in temperature.

43. The method of claim 42 wherein the first and second relationships are derived by alternately connecting the fixed means into operative relationship with the first and second pressure sensing means.

44. A circuit for providing an output signal as a function of a first input condition, the first input condition being in the presence of a second input condition, comprising:

generating means coupled to the first and second input conditions for providing first and second generator signals, the generating means including first and second sensing means having reactance values which are functions of the first and second input conditions, reactance means having a reactance value which is substantially fixed in relation to variations in the second input condition, and connection means responsive to a control signal for selectively connecting the reactance means to the first and second sensing means in first and second modes so that current through the reactance means is algebraically summed with current through the first sensing means in the first mode and current through the reactance means is algebraically summed with current through the second sensing means in the second mode, the first and second sensing means and the reactance means forming charge packets representative of the first and second input conditions, the first generator signal comprising a first plurality of charge packets formed while the connection means is in its first mode, the second generator signal comprising a second plurality of charge packets formed while the connection means is in its second mode;

measurement means coupled to the generating means and responsive to the first and second generator signals for providing respective first and second measurement signals as functions of the first and second generator signals;

feedback means coupled to the measurement means for providing the control signal to the generating means as a function of the measurement signal; and output means providing the output signal as a function of counts of numbers of charge packets contained in the first and second generator signals.

45. The circuit according to claim 44 wherein the first and second pluralities of charge packets each includes first charge packets having a first polarity and second charge packets having a second polarity opposite the first polarity, and the feedback means further provides a feedback signal to control the generator means such that the generator means tends toward a charge-balanced state.

46. The circuit according to claim 45 wherein the number of charge packets of the first and second pluralities of charge packets each equals a predetermined number, the control signal operating the connection means to change between its first and second modes when the number of charge packets of either the first or second pluralities of charge packets reaches the predetermined number.

47. The circuit according to claim 44 wherein the number of charge packets of the first and second pluralities of charge packets each equals a predetermined number, the control signal operating the connection means to change between its first and second modes when the number of charge packets of either the first or second pluralities of charge packets reaches the predetermined number.

* * * * *

UNITED STATES PATENT AND TRADEMARK OFFICE
CERTIFICATE OF CORRECTION

PATENT NO. : 5,329,818
DATED : July 19, 1994
INVENTOR(S) : Roger L. Frick, et al It is certified that error appears in the above-indentified patent and that said Letters Patent is hereby corrected as shown below:

Column 2, line 46, delete "$R_e$" and insert --$R_8$--.

Column 3, line 5, delete "in".

Column 6, line 22, after "input" insert --220--.

Column 17, line 40, after "the" delete "a".

UNITED STATES PATENT AND TRADEMARK OFFICE
CERTIFICATE OF CORRECTION

PATENT NO. : 5,329,818

DATED : July 19, 1994

INVENTOR(S) : Roger L. Frick, et al

It is certified that error appears in the above-indentified patent and that said Letters Patent is hereby corrected as shown below:

Column 18, line 18, after first occurrence "sensing" insert --means--.

Column 18, line 51, after "the" delete "a".

Column 18, line 68, after first occurrence "sensing" insert --means--.

Column 21, line 29, delete "first a" and insert --a first--.

Signed and Sealed this

Twenty-ninth Day of August, 1995

Attest:

BRUCE LEHMAN

*Attesting Officer*        *Commissioner of Patents and Trademarks*